June 24, 1930.   H. O. HEM   1,768,477
COUNTING DEVICE
Filed Oct. 18, 1926   2 Sheets-Sheet 2
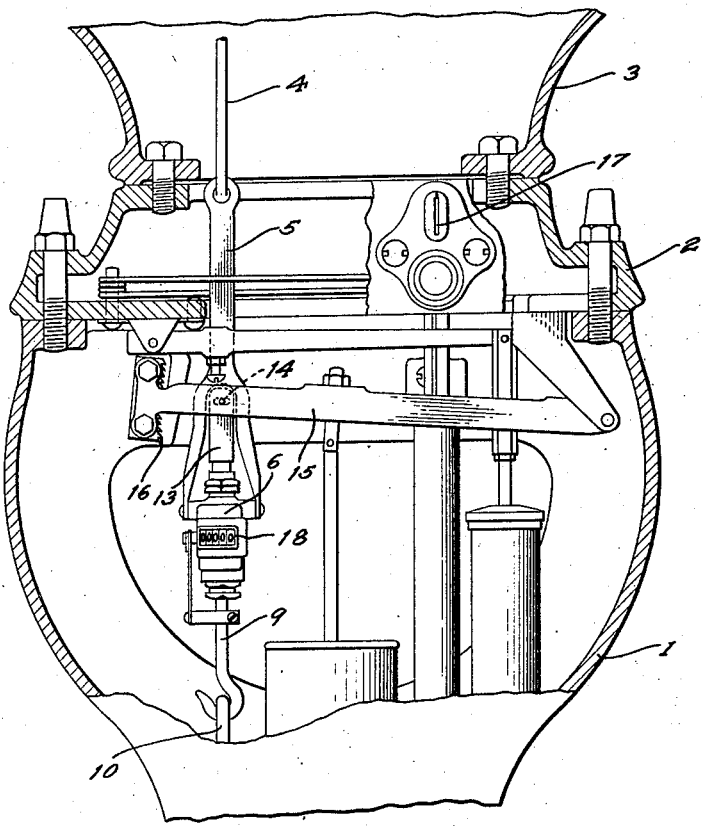
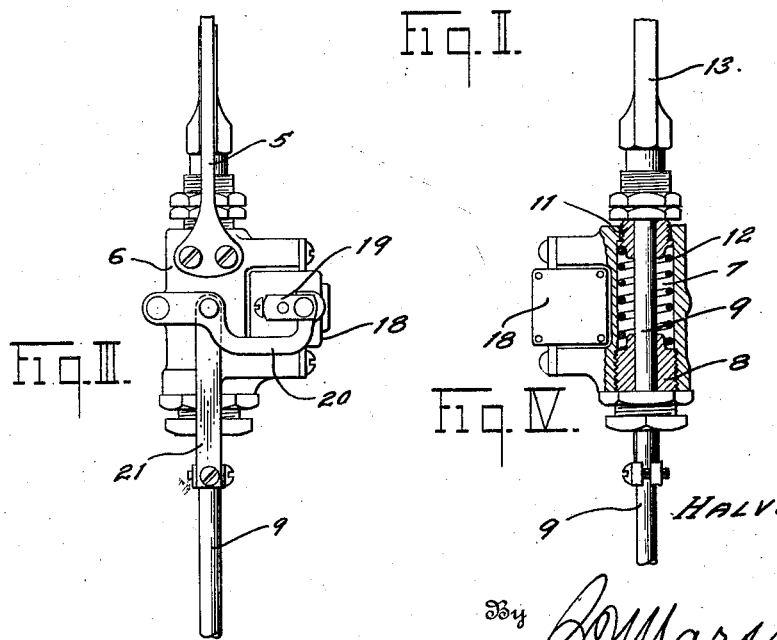
Inventor
HALVOR O. HEM.

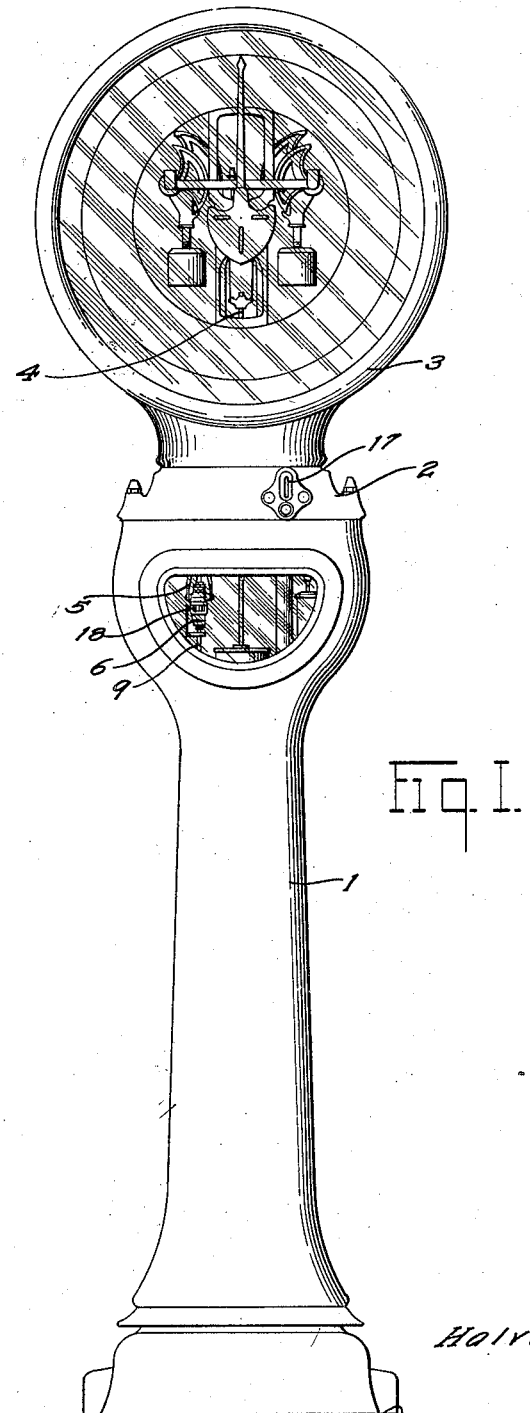

Patented June 24, 1930

1,768,477

UNITED STATES PATENT OFFICE

HALVOR O. HEM, OF TOLEDO, OHIO, ASSIGNOR TO TOLEDO SCALE COMPANY, OF TOLEDO, OHIO, A CORPORATION OF NEW JERSEY

COUNTING DEVICE

Application filed October 18, 1926. Serial No. 142,216.

This invention relates to counting devices, and particularly to means for connecting such devices to the mechanism of coin-controlled automatic weighing scales.

One of the objects of this invention is to provide a combined weighing scale, counting device and coin-controlled locking device in order that a check may be kept on the number of weighings, as well as the number of coins deposited.

Another object is the provision of connecting means which will operate a counter only upon the unlocking of the weighing mechanism and the loading of the platform.

Another object of the invention is to provide a device of this kind which will operate without adding anything to the friction of a weighing mechanism.

Another object is the provision of connecting means of this character which is simple and compact in construction, which is capable of installation by mere substitution for a connecting link of the weighing mechanism, and which is readily accessible for removal or adjustment.

Other objects and advantages will be apparent from the following description, in which reference is had to the accompanying drawings illustrating a preferred embodiment of my invention and wherein similar reference numerals designate similar parts throughout the several views.

In the drawings:—

Figure I is a front elevational view of a coin-controlled weighing scale embodying my invention;

Figure II is a front elevational view on an enlarged scale, parts being broken away and parts shown in section, of the portion of the weighing scale in which the counter is incorporated;

Figure III is a further enlarged side elevational view of the counter and connecting mechanism; and Figure IV is a sectional elevational view thereof taken from the opposite side.

Referring to the drawings in detail, the mechanism as shown is contained in the upper end of a column 1 of a coin-operated person weighing scale, the coin-controlled locking device being supported by a frame 2 interposed between the upper end of the column 1 and the lower end of the casing 3 which supports the load-counterbalancing and indicating mechanism of the scale. A rod 4 depends from the automatic load-counterbalancing mechanism, and connected to a hook at the lower end of the rod 4 is a forked link 5, the lower forked end of the link 5 being secured to a casting 6. The casting 6 is provided with a vertical bore 7, the lower end of which is threaded to receive a threaded plug 8. Extending vertically through the plug 8 and slidable therein is a rod 9, the lower end of which is connected by means of a hook to another rod 10 which extends downwardly to the platform lever mechanism of the scale.

Mounted upon the rod 9 and slidable in the upper end of the bore 7 is a collar 11, and an expansive spring 12 is located in the bore 7 and compressed between the plug 8 and the collar 11. Secured to the upper end of the rod 9 is an ear 13 having an opening through which passes a pin 14 secured to a lever 15 of the coin-controlled mechanism. The lever 15 is locked against movement by means of teeth 16 which are withdrawn from locking engagement when the mechanism is operated after the insertion of a coin in the coin slot 17. Since the present invention does not consist of the coin mechanism per se, I shall not here describe it in detail. It will be seen that the rod 9 can only be pulled downwardly when the lever 15 is released. If the scale be loaded without releasing the lever 15 the rod 9 will be held against downward movement by the pin 14. If, however, the platform be loaded and the lever 15 released, the rod 9 will be pulled downwardly and a downward pressure will be exerted upon the casting 6 through the spring 12. This downward pressure on the casting 6 will in turn create a downward pull on the link 5 and rod 4 and the load-counterbalancing and indicating mechanism of the scale will thus be operated. The amount of pull on the rod 4 will be the same as though the connection between it and the rod 10 were a non-extensible link, so that the interposition of the spring 12 will not affect the accuracy of the scale.

Mounted upon the casting 6 is a counter 18 of the Veeder type, and connected to the operating arm 19 of the counter is a lever 20 which in turn is connected by means of a link 21 to the rod 9, the parts being so adjusted that each time the rod 9 moves downwardly after the lever 15 has been released the counter 18 is operated.

The embodiment of my invention herein shown and described is to be regarded as illustrative only, and it is to be understood that the invention is susceptible to variation, modification and change within the spirit and scope of the subjoined claims.

Having described my invention, I claim:

1. In a device of the class described, in combination, an extensible connection, one part of said connection being adapted for connection to a load receiver, another part thereof being adapted for connection to load-counterbalancing mechanism, a counter adapted for operation by relative movement of said parts, and coin-controlled mechanism for releasably preventing relative movement thereof.

2. In a device of the class described, in combination, an extensible connection, one part of said connection being adapted for connection to a load receiver, another part thereof being adapted for connection to load-counterbalancing mechanism, a counter adapted for operation by relative movement of said parts, coin-controlled mechanism, and means whereby the part adapted for connection to a load receiver is releasably held by said coin-controlled mechanism against movement.

3. In a device of the class described, in combination, weighing mechanism, a counter, and means for operatively connecting said counter to said weighing mechanism, said means constituting a link connection in said weighing mechanism and coin-controlled means for releasably holding said link against operation.

4. In a device of the class described, in combination, coin-controlled weighing mechanism, an extensible connection, a counter, and means for operating said counter by the extension of said connection, said connection constituting a link in said weighing mechanism and coin-controlled means for releasably holding said connection against extension.

5. In a device of the class described, in combination, a load receiver, a counter, automatic load-counterbalancing mechanism, means for connecting said load receiver, said counter and said automatic load-counterbalancing mechanism in series, and coin-controlled means for locking the connecting means from said load receiver to said counter against movement.

HALVOR O. HEM.